US012640589B2

(12) United States Patent
Wang et al.

(10) Patent No.: US 12,640,589 B2
(45) Date of Patent: May 26, 2026

(54) CIRCUIT OF WIRELESS CHARGING AND METHOD OF CHARGING BATTERY

(71) Applicant: BEIJING XIAOMI MOBILE SOFTWARE CO., LTD., Beijing (CN)

(72) Inventors: Zhongshuai Wang, Beijing (CN); Jie Fan, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 834 days.

(21) Appl. No.: 17/978,200

(22) Filed: Oct. 31, 2022

(65) Prior Publication Data

US 2024/0039334 A1 Feb. 1, 2024

(30) Foreign Application Priority Data

Jul. 28, 2022 (CN) .......................... 202210901362.2

(51) Int. Cl.
| | |
|---|---|
| *H02J 7/00* | (2026.01) |
| *H02J 7/64* | (2026.01) |
| *H02J 7/82* | (2026.01) |
| *H02J 7/90* | (2026.01) |
| *H02J 7/96* | (2026.01) |
| *H02J 50/10* | (2016.01) |
| *H02J 50/80* | (2016.01) |

(52) U.S. Cl.
CPC ................ *H02J 50/10* (2016.02); *H02J 7/64* (2026.01); *H02J 7/82* (2026.01); *H02J 7/96* (2026.01); *H02J 7/971* (2026.01); *H02J 50/80* (2016.02); *H02J 2207/20* (2020.01)

(58) Field of Classification Search
None
See application file for complete search history.

(56) References Cited

U.S. PATENT DOCUMENTS

| | | | |
|---|---|---|---|
| 2020/0076249 A1 | 3/2020 | Mao et al. | |
| 2021/0194268 A1* | 6/2021 | Jia .............................. | H02J 7/02 |

FOREIGN PATENT DOCUMENTS

| | | |
|---|---|---|
| WO | 2020062481 A1 | 4/2020 |

OTHER PUBLICATIONS

The Partial European Search Report issued in Application No. 22204717.7, dated May 31, 2023,(15p).

* cited by examiner

*Primary Examiner* — Arun C Williams

(74) *Attorney, Agent, or Firm* — Arch & Lake LLP; Hao Tan; Shen Wang

(57) ABSTRACT

A circuit of wireless charging and a method of charging a battery. The circuit includes: a wireless receiver, configured to receive a charging power transmitted by a wireless transmitter of a wireless charging apparatus through electromagnetic induction; a charge pump circuit configured to receive a boosted input voltage from the voltage output end, and step down the input voltage to an output voltage of the charge pump circuit, to charge a battery; a step-down converter circuit configured to perform the step-down charging on the battery at least in a case that a charging mode is in a constant voltage mode; and a controller configured to select one between the charge pump circuit and the step-down converter circuit as a charging path to charge the battery based on a voltage difference between the input voltage from the voltage output end of the wireless receiver and a charging voltage of the battery.

18 Claims, 7 Drawing Sheets wireless efficiency attenuation

CIRCUIT OF WIRELESS CHARGING AND METHOD OF CHARGING BATTERY

CROSS-REFERENCE TO RELATED APPLICATION

The present application is filed upon and claims priority to Chinese Patent Application No. 202210901362.2 filed on Jul. 28, 2022, the contents of which are incorporated herein by reference in their entireties for all purposes.

TECHNICAL FIELD

The disclosure relates to a field of electronic technologies, and particularly to a circuit of wireless charging and a method of charging a battery.

BACKGROUND

With the development of electronic technologies, various electronic devices are emerging, including a wearable electronic device. The wearable electronic device is integrated with a power supply battery. Wireless charging is a future technology trend in the wearable electronic device due to its characteristics of beauty, comfort and experience.

SUMMARY

A circuit of wireless charging and a method of charging a battery for a wearable device are provided in the present disclosure.

According a first aspect of the present disclosure, a circuit of wireless charging for a wearable device is provided. The circuit includes: a wireless receiver, configured to receive a charging power transmitted by a wireless transmitter of a wireless charging apparatus through electromagnetic induction; a charge pump circuit connected to a voltage output end of the wireless receiver, configured to receive an input voltage that is boosted from the voltage output end, and step down the input voltage to an output voltage of the charge pump circuit, to charge a battery in the wearable device based on the input voltage that has been stepped down; a step-down converter circuit connected to the voltage output end of the wireless receiver, configured to perform the step-down charging on the battery at least in response to determining that a charging mode is in a constant voltage mode; and a controller electrically connected to the wireless receiver, the charge pump circuit and the step-down converter circuit, configured to select one between the charge pump circuit and the step-down converter circuit as a charging path to charge the battery based on a voltage difference between the input voltage from the voltage output end of the wireless receiver and a charging voltage of the battery.

According to a second aspect of the present disclosure, a circuit of wireless charging for a wireless charging apparatus is provided. The circuit includes: a wireless transmitter, configured to transmit a charging power with a wireless receiver of a wearable device through electromagnetic induction; and a controller electrically connected to the wireless transmitter, configured to adjust a coil voltage of the wireless transmitter based on a charging voltage of a battery of the wearable device, where adjusting the coil voltage of the wireless transmitter may include boosting the coil voltage of the wireless transmitter.

According to a third aspect of the present disclosure, a method of charging a battery for a wearable device is provided. The method includes: monitoring a voltage difference between an input voltage from a voltage output end of a wireless receiver and a charging voltage of a battery of a wearable device; and selecting one circuit between a charge pump circuit and a step-down converter circuit as a charging path to charge the battery based on the voltage difference between the input voltage from the voltage output end of the wireless receiver and the charging voltage of the battery. The wireless receiver is configured to receive a charging power transmitted by a wireless transmitter through electromagnetic induction; the charge pump circuit is configured to receive an input voltage that is boosted from the voltage output end, and step down the input voltage to an output voltage of the charge pump circuit, to charge the battery based on the input voltage that has been stepped down; and the step-down converter circuit is configured to perform step-down charging on the battery at least in a case that a charging mode is in in a constant voltage mode.

It should be noted that, the details above and in the following are exemplary and illustrative, and do not constitute the limitation on the present disclosure.

BRIEF DESCRIPTION OF THE DRAWINGS

The drawings herein are incorporated into the specification and constitute a part of the specification, show embodiments in conformity with embodiments of the present disclosure, and explain the principle of the present disclosure together with the specification.

DETAILED DESCRIPTION

The example embodiments will be described in detail here, and examples thereof are shown in the accompanying drawings. When the following descriptions refer to the accompanying drawings, unless otherwise indicated, the same numbers in different drawings represent the same or similar elements. The implementations described in the following exemplary embodiments do not represent all implementations consistent with the present disclosure. Rather, they are merely examples of apparatuses consistent with some aspects of the disclosure as detailed in the appended claims.

With the development of electronic technologies, various electronic devices are emerging, including a wearable electronic device. The wearable electronic device is integrated with a power supply battery. Wireless charging is a future technology trend in the wearable electronic device due to its characteristics of beauty, comfort and experience.

Figure 1:
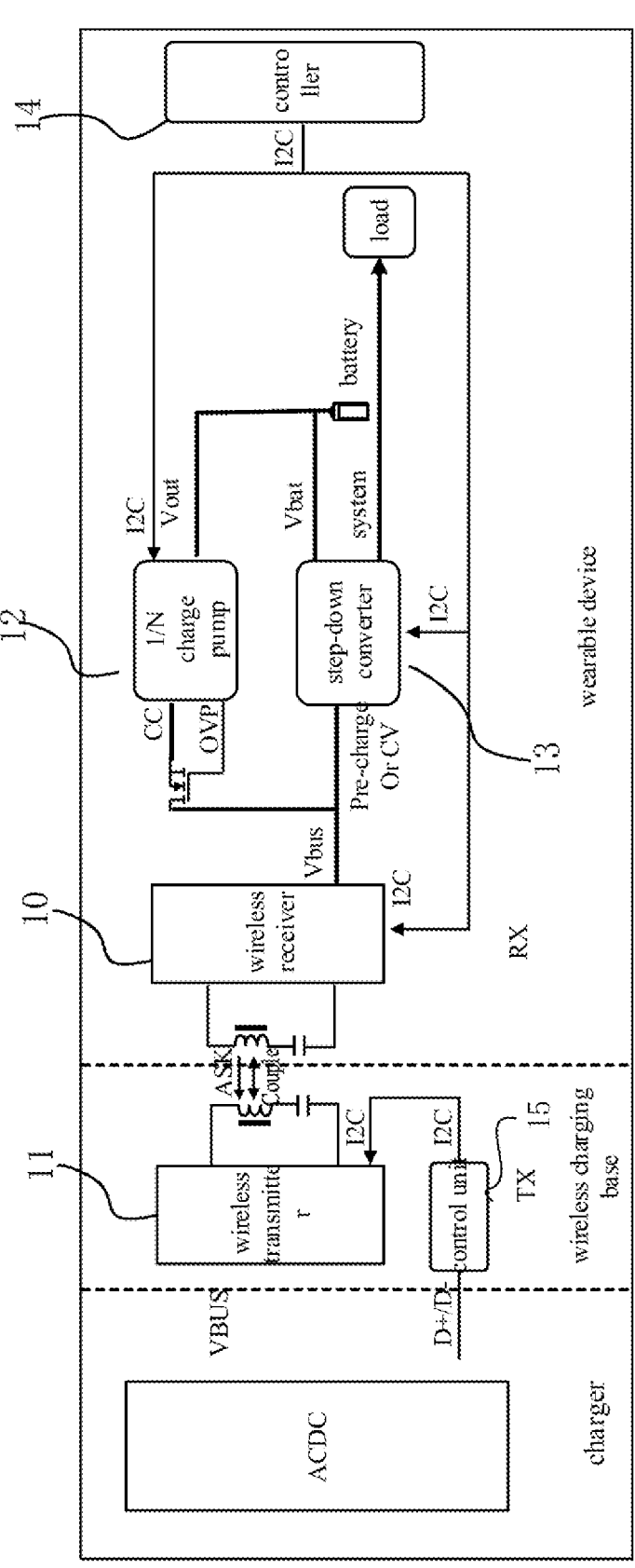
FIG. 1 is a schematic diagram illustrating a circuit of wireless charging for a wearable device according to an embodiment of the disclosure.

A circuit of wireless charging for a wearable device is provided in an embodiment of the disclosure. FIG. 1 is a schematic diagram illustrating a circuit of wireless charging for a wearable device according to an embodiment. As illustrated in FIG. 1, the circuit of wireless charging for the wearable device may include a wireless receiver 10, a charge pump circuit 12, a step-down converter circuit 13 and a controller 14.

Figure 3:
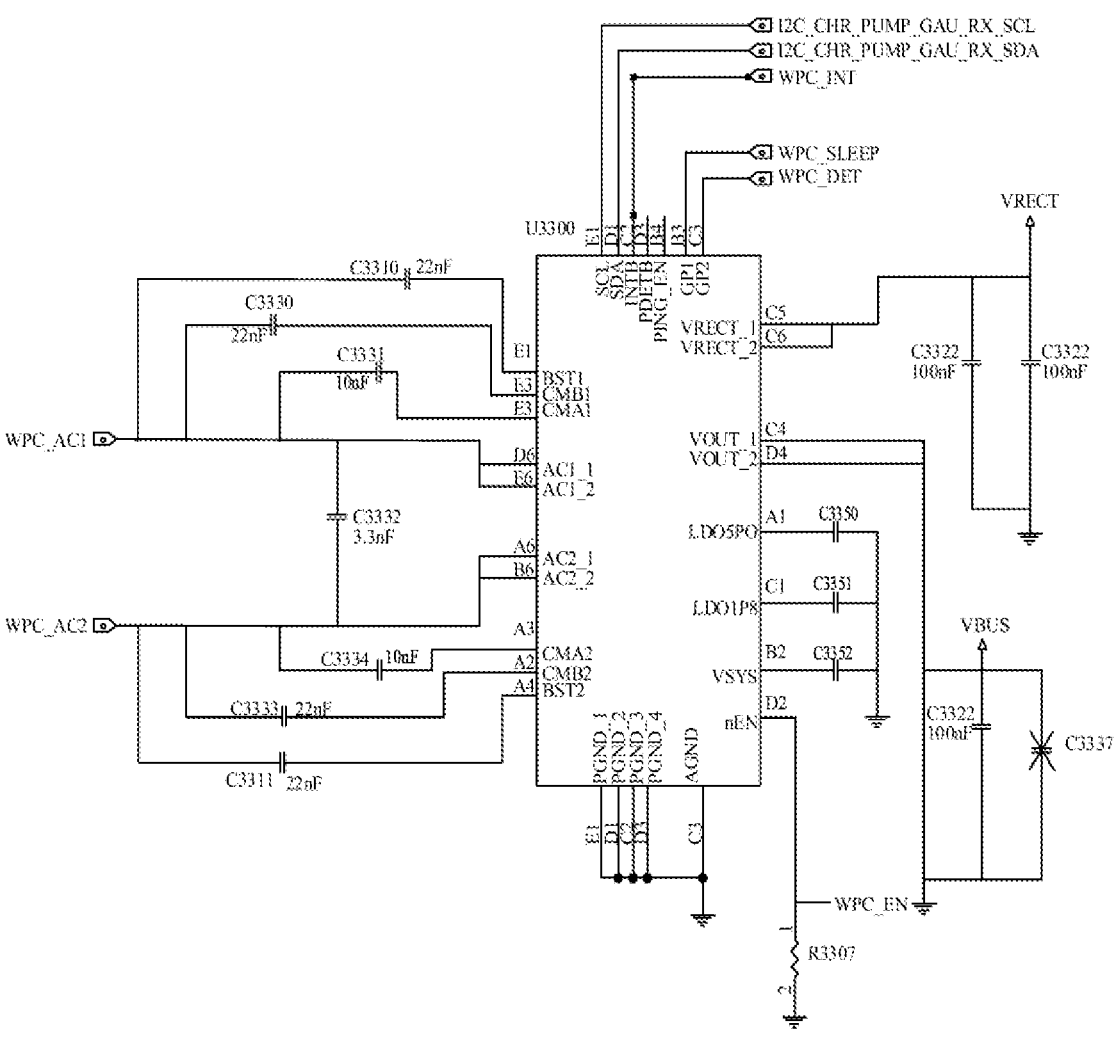
FIG. 3 is a schematic diagram illustrating a circuit of a wireless receiver according to an embodiment of the disclosure.

The wireless receiver 10 is configured to receive a charging power transmitted by a wireless transmitter 11 through electromagnetic induction. For example, FIG. 3 shows an illustrative circuit of the wireless receiver.

The charge pump circuit 12 is connected to a voltage output end Vbus of the wireless receiver 10 and is configured to boost an input voltage from the voltage output end Vbus, and step down an output voltage of the charge pump circuit 12 through energy storage of an internal capacitor, to perform step-down charging on a battery.

The step-down converter circuit 13 is connected to the voltage output end Vbus of the wireless receiver 10 and is at least configured to perform the step-down charging on the battery in a constant voltage mode.

The controller 14 is electrically connected to the wireless receiver 10, the charge pump circuit 12 and the step-down converter circuit 13, and is configured to select one circuit between the charge pump circuit 12 and the step-down converter circuit 13 as a charging path to charge the battery based on a voltage difference between the input voltage from the voltage output end Vbus of the wireless receiver 10 and a charging voltage of the battery.

Figure 2:
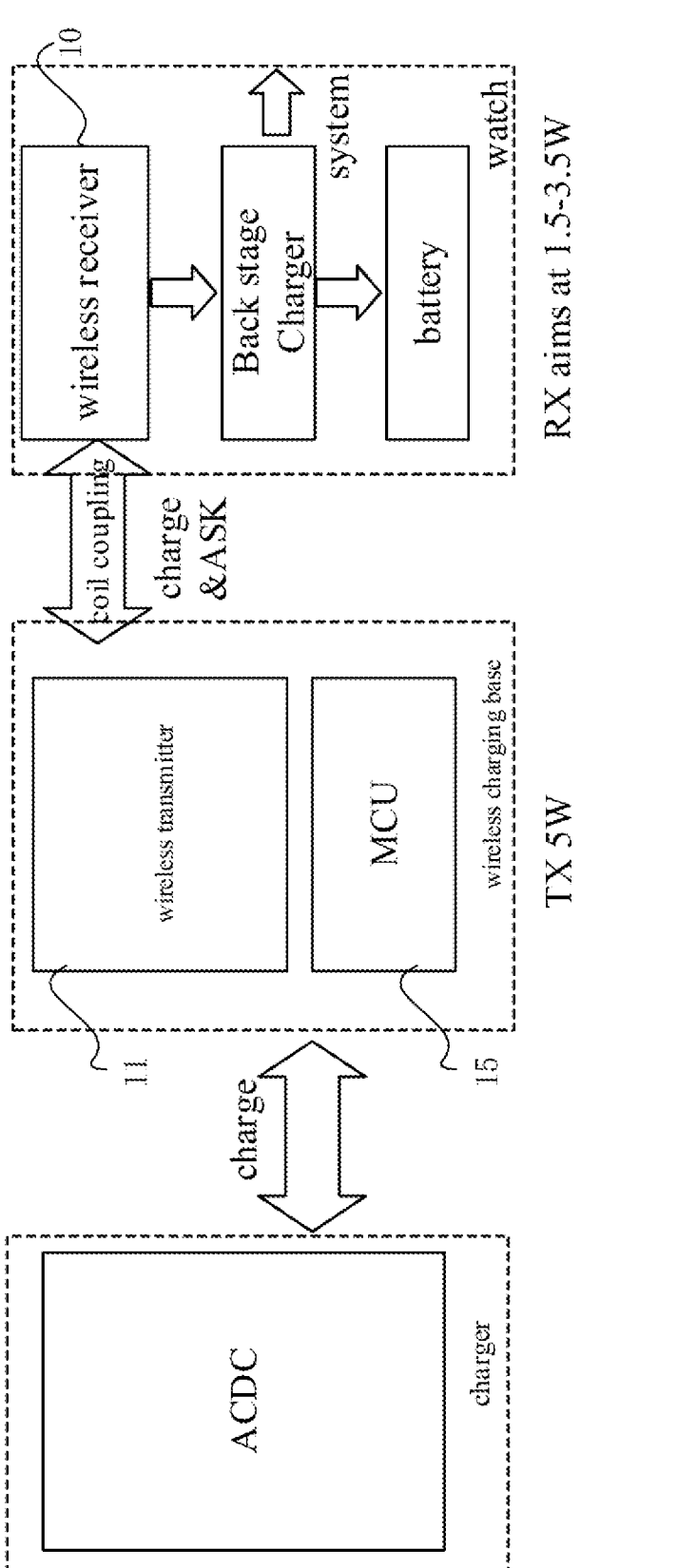
FIG. 2 is a schematic diagram illustrating a structure of a circuit of wireless charging for a wearable device according to an embodiment of the disclosure.

In an embodiment of the present disclosure, FIG. 2 is a schematic diagram illustrating a structure of a circuit of wireless charging for a wearable device according to an embodiment. A back-stage Charger illustrated in FIG. 2 may include the charge pump circuit 12 and the step-down converter circuit 13 illustrated in FIG. 1. AC/DC refers to a power converter with AC input and DC output.

The charge pump circuit 12 may step down the output voltage of the voltage output end Vbus through the energy storage of the capacitor to charge the battery, which may reduce a power loss and improve a charging efficiency compared with the converter. Voltage may be stepped down in an integer multiple. For example, when the charging voltage of the battery is 3V, the voltage of the voltage output end Vbus is 6V, 9V, etc. The charge pump circuit 12 may step down the voltage 6V, 9V of the voltage output end to the charging voltage 3V of the battery, to charge the battery.

In an embodiment of the disclosure, a wireless charging circuit for a wireless charging apparatus may include a wireless transmitter 11 and a control unit 15.

The wireless transmitter 11 is configured to transmit a charging power through electromagnetic induction between the wireless transmitter 11 and the wireless receiver 10.

The control unit 15 is electrically connected to the wireless transmitter 11, and is configured to adjust a coil voltage of the wireless transmitter 11 based on the charging voltage of the battery, including boosting the coil voltage of the wireless transmitter 11. In some examples, the control unit 15 may include a controller. For example, the control unit 15 may include the MCU as shown in FIG. 2.

In an embodiment of the disclosure, the wireless transmitter 11 is in a wireless charging apparatus and coupled to an electromagnetic coil of the wireless receiver 10 in the wearable device to transmit the charging power.

For example, the wireless charging apparatus may be a device capable of charging, such as a wireless charging base or a mobile phone with reverse charging function.

In an embodiment of the present disclosure, since the charge pump circuit 12 may regulate a voltage drop, the control unit 15 in the wireless charging apparatus may boost the coil voltage of a charging power transmitted by the wireless transmitter 11 based on the monitored charging voltage of the battery, to boost the input voltage from the voltage output end Vbus of the wireless receiver 10. When charging with the same charging power, with boosting the input voltage from the voltage output end Vbus of the wireless receiver 10 by boosting the coil voltage of the charging power of the wireless transmitter 11, a current under the same power is reduced since a voltage of the electromagnetic coil is boosted. A power loss of coils between the wireless transmitter 11 and the wireless receiver 10 may be effectively reduced based on a power loss $P=I^2R$. In addition, with regulating the voltage drop by the charge pump circuit 12, an electric energy loss during charging the battery may be reduced and a charging efficiency may be improved.

In an embodiment of the present disclosure, the controller 14 is in a wearable device, and connected with the wireless receiver 10, the charge pump circuit 12 and the step-down converter circuit 13 through an $I^2C$ bus. The controller 14 may read the input voltage from the wireless receiver 10 by the $I^2C$ bus, and select one circuit between the charge pump circuit 12 and the step-down converter circuit 13 as the charging path to charge the battery based on the voltage difference between the input voltage from the voltage output end Vbus of the wireless receiver 10 and the charging voltage of the battery. For example, when the voltage difference between the input voltage from the voltage output end Vbus of the wireless receiver 10 and the charging voltage of the battery is an integer multiple greater than or equal to 2 of the charging voltage of the battery, the charge pump circuit 12 is selected as the charging path to charge the battery. When the voltage difference between the input voltage from the voltage output end Vbus of the wireless receiver 10 and the charging voltage of the battery is less than the charging voltage of the battery, the step-down converter circuit 13 is selected as the charging circuit to charge the battery. For example, when the charging voltage of the battery is 3V, the voltage of the voltage output end Vbus is 6V, or 9V, etc. Selecting the charge pump circuit 12 as the charging path may cause the voltage 6V or 9V of the voltage output end Vbus to be stepped down to the charging voltage 3V of the battery, to charge the battery.

The circuit of wireless charging for the wearable device in an embodiment of the disclosure includes the wireless receiver 10 configured to receive the charging power transmitted by the wireless transmitter 11 through electromagnetic induction; the charge pump circuit 12 connected to the voltage output end Vbus of the wireless receiver 10, configured to step down the output voltage of the charge pump circuit 12 through energy storage of the internal capacitor, to perform step-down charging on the battery; the step-down converter circuit 13 connected to the voltage output end Vbus of the wireless receiver 10, at least configured to perform the step-down charging on the battery in the constant voltage mode; and the controller 14 electrically connected to the wireless receiver, the charge pump circuit 12 and the step-down converter circuit 13, configured to select one between the charge pump circuit 12 and the step-down converter circuit 13 as the charging path to charge the battery based on the voltage difference between the input voltage from the voltage output end Vbus of the wireless receiver 10 and a charging voltage of the battery. In the present disclosure, the charge pump circuit 12 is provided in the charging circuit for the wearable device, and the output voltage is stepped down based on the energy storage of the capacitor to charge the battery, which is beneficial to reducing a power loss and improving a charging efficiency.

In some embodiments, a wireless communication between the wireless transmitter 11 and the wireless receiver 10 may be established.

The control unit 15 is configured to acquire the charging voltage of the battery through the wireless communication, and adjust the coil voltage of the wireless transmitter 11 based on a boost requirement of the charge pump circuit 12.

In an embodiment of the disclosure, the battery is charged via the wireless charging apparatus. The wireless communication between the wireless transmitter 11 of the wireless charging apparatus and the wireless receiver 10 of the wearable device may be established. The wireless charging apparatus may monitor or acquire charging data of the battery in the wearable device through the wireless communication. The charging data may include the charging voltage of the battery. The control unit 15 in the wireless charging apparatus may adjust the coil voltage of the wireless transmitter 11 based on the boost requirement of the charge pump circuit 12 by acquiring the charging voltage of the battery through the wireless communication.

In some embodiments, the control unit 15 is configured to acquire a communication mark used when the wireless communication between the wearable device and a wireless charging apparatus is established. The communication mark is at least configured to identify whether the wearable device is an authorizable charging terminal of the wireless charging apparatus, and the wireless charging apparatus at least includes the wireless charging circuit.

The control unit 15 is configured to perform the wireless charging on the wearable device through the wireless charging circuit based on the established wireless communication in response to determining that the communication mark identifies that the wearable device is the authorizable charging terminal of the wireless charging apparatus.

In an embodiment of the present disclosure, before the wireless charging apparatus establishes the wireless communication with the wearable device, it is required to match the communication mark. In the disclosure, the communication mark is configured to identify whether the wearable device is the authorizable charging terminal of the wireless charging apparatus. It may be determined that the wearable device is the authorizable charging terminal of the wireless charging apparatus in response to determining that the communication mark is successfully matched. In this case, the wireless charging apparatus may establish the wireless communication with the wearable device. Then, based on the established wireless communication, the wearable device is wirelessly charged through the wireless charging circuit. The communication mark may be determined as any form of information mark, such as a character mark or a character string mark.

In some embodiments, the controller 14 is configured to, determine a remaining power of the battery, and determine a charging mode of the wireless charging circuit for the wearable device based on the remaining power of the battery.

Different charging modes correspond to different charging voltages of the wireless charging circuit for the wearable device.

In an embodiment of the disclosure, the charging modes at least may include a quick charge mode, a constant voltage mode, etc. When the remaining power of the battery is very small, the battery may be charged in the quick charge mode. In the quick charge mode, the wearable device may be charged by the charge pump circuit 12 in a constant current charging manner. When the charging voltage of the battery is boosted as the battery is charged, the input voltage of the charge pump circuit 12 will be constantly boosted. However, the current may remain basically stable to quickly charge the battery.

In an embodiment of the disclosure, determining the charging mode of the wireless charging circuit for the wearable device based on the remaining power of the battery may include:

performing the step-down charging on the battery in a first charging mode through the step-down converter circuit 13 in response to determining that the remaining power of the battery is greater than a first threshold; and performing the step-down charging on the battery in a second charging mode through the charge pump circuit 12 in response to determining that the remaining power of the battery is less than the first threshold, the first charging mode is different from the second charging mode, and the charging voltage of the battery under the first charging mode is less than the charging voltage of the battery under the second charging mode.

In some embodiments, the controller 14 is configured to:

acquire a physical sign state of a human body; and perform the step-down charging on the battery in a first charging mode by the step-down converter circuit 13 in response to determining that the physical sign state is a sleep state;

perform the step-down charging on the battery in a second charging mode by the charge pump circuit 12 in response to determining that the physical sign state is an active state.

In an embodiment of the disclosure, when the physical sign state is the sleep state, the wearable device is in a rest state, and the step-down charging is performed on the battery in the first charging mode with a small current through the step-down converter circuit 13. When the physical sign state is the active state, the wearable device is in an operating state, and the step-down charging is performed on the battery in the second charging mode with a large current through the step-down converter circuit 13.

It is noted that the physical sign state may be monitored by the wearable device itself, or may be acquired from a mobile phone, a mobile phone or another wearable device, etc. For example, the mobile phone may acquire the physical sign state monitored before charging the wearable device, determine the physical sign state of the human body in combination with historical data, lifestyle statistics of the user, etc., and then send the physical sign state to the wearable device. For another example, the wearable device may receive the physical sign state of the human body monitored by another wearable device, or receive the physical sign state of the human body obtained by the mobile phone from another wearable device. In addition, the physical sign state may also be input by the user.

Figure 4:
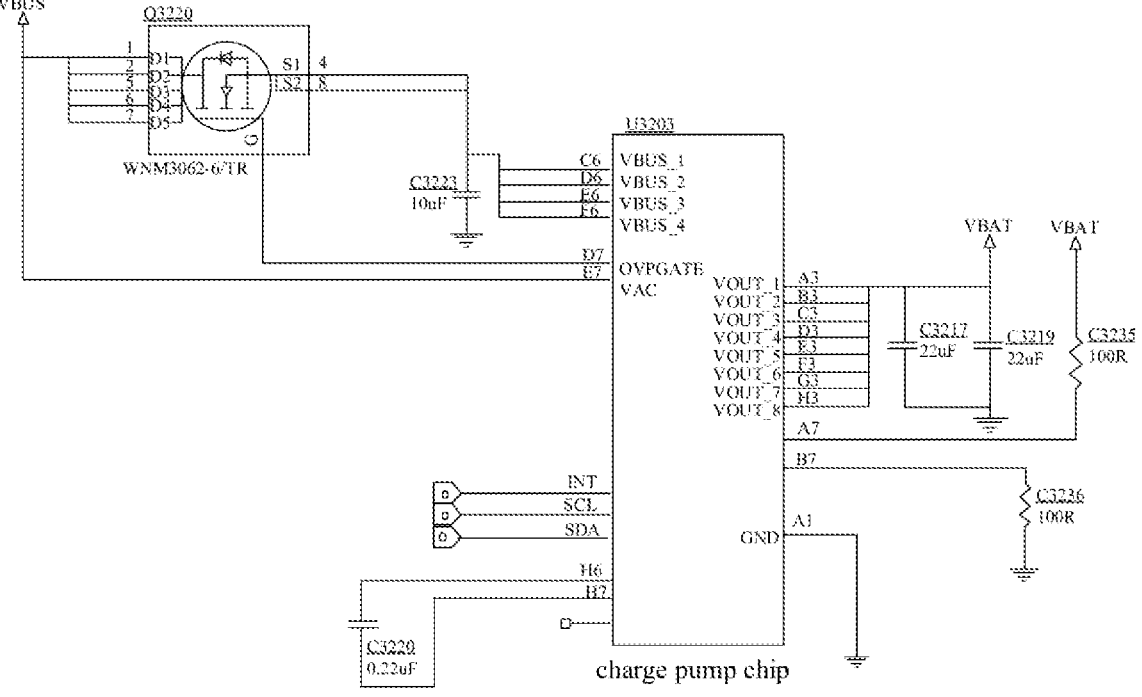
FIG. 4 is a schematic diagram illustrating a charge pump circuit according to an embodiment of the disclosure.

In some embodiments, as illustrated in FIG. 4, the charge pump circuit 12 at least includes:

a charge pump chip, at least including:

voltage input pins VBUS_1~VBUS_4;

an overvoltage protection pin OVPGATE;

a triode Q3220, at least including:

a drain D connected to the voltage output end Vbus of the wireless receiver 10, configured to receive an output voltage of the voltage output end Vbus;

a source S connected to the voltage input pin of the charge pump chip, configured to transmit the output voltage to the charge pump chip; and a gate G connected to the overvoltage protection pin OVPGATE of the charge pump chip, configured to provide overvoltage protection for the charge pump chip.

In an embodiment of the disclosure, the controller 14 controls the operating state of the charge pump circuit 12 by controlling turn-on and turn-off of the triode. When the triode is turned on, the charge pump circuit 12 operates, and when the triode is turned off, the charge pump circuit 12 does not operate. When the charge pump circuit 12 operates, the controller 14 controls the step-down converter circuit 13 not to operate via an $I^2C$ bus. When the charge pump circuit 12 does not operate, the controller 14 controls the step-down converter circuit 13 to operate via the $I^2C$ bus. The charge pump circuit 12 generally operates in the constant current mode, to charge the battery.

In some embodiments, the voltage input pins VBUS_1~VBUS_4 at least include:

a first input pin VBUS_1;

a second input pin VBUS_2;

a third input pin VBUS_3; and a fourth input pin VBUS_4.

The first input pin, the second input pin, the third input pin, and the fourth input pin each is connected in parallel with the source of the triode.

In an embodiment of the disclosure, the charge pump chip may include four voltage input pins. The four voltage input pins are connected in parallel with the source of the triode, such that the four voltage input pins operate.

In some embodiments, the charge pump chip may include:

voltage output pins VOUT_1~VOUT_8; and the voltage output pins are connected to a capacitor C3217/C3219 for energy storage.

A first terminal of the capacitor is grounded, and a second terminal of the capacitor is configured to connect a positive electrode VBAT of the battery.

In an embodiment of the disclosure, the capacitor for energy storage may include a plurality of capacitors connected in parallel. The voltage output pin is serially connected with the plurality of capacitors connected in parallel, to achieve capacitive energy storage.

In some embodiments, the voltage output pins VOUT_1~VOUT_8 may include:

a first output pin VOUT_1;

a second output pin VOUT_2;

a third output pin VOUT_3;

a fourth output pin VOUT_4;

a fifth output pin VOUT_5;

a sixth output pin VOUT_6;

a seventh output pin VOUT_7;

an eighth output pin VOUT_8.

The first output pin, the second output pin, the third output pin, the fourth output pin, the fifth output pin, the sixth output pin, the seventh output pin and the eighth output pin are connected in parallel with each other, and then serially connected with the capacitor.

In an embodiment of the disclosure, the charge pump chip may include eight voltage output pins, the eight voltage output pins connected in parallel are serially connected with the capacitor, such that the eight voltage output pins are energized to operate.

Figure 5:
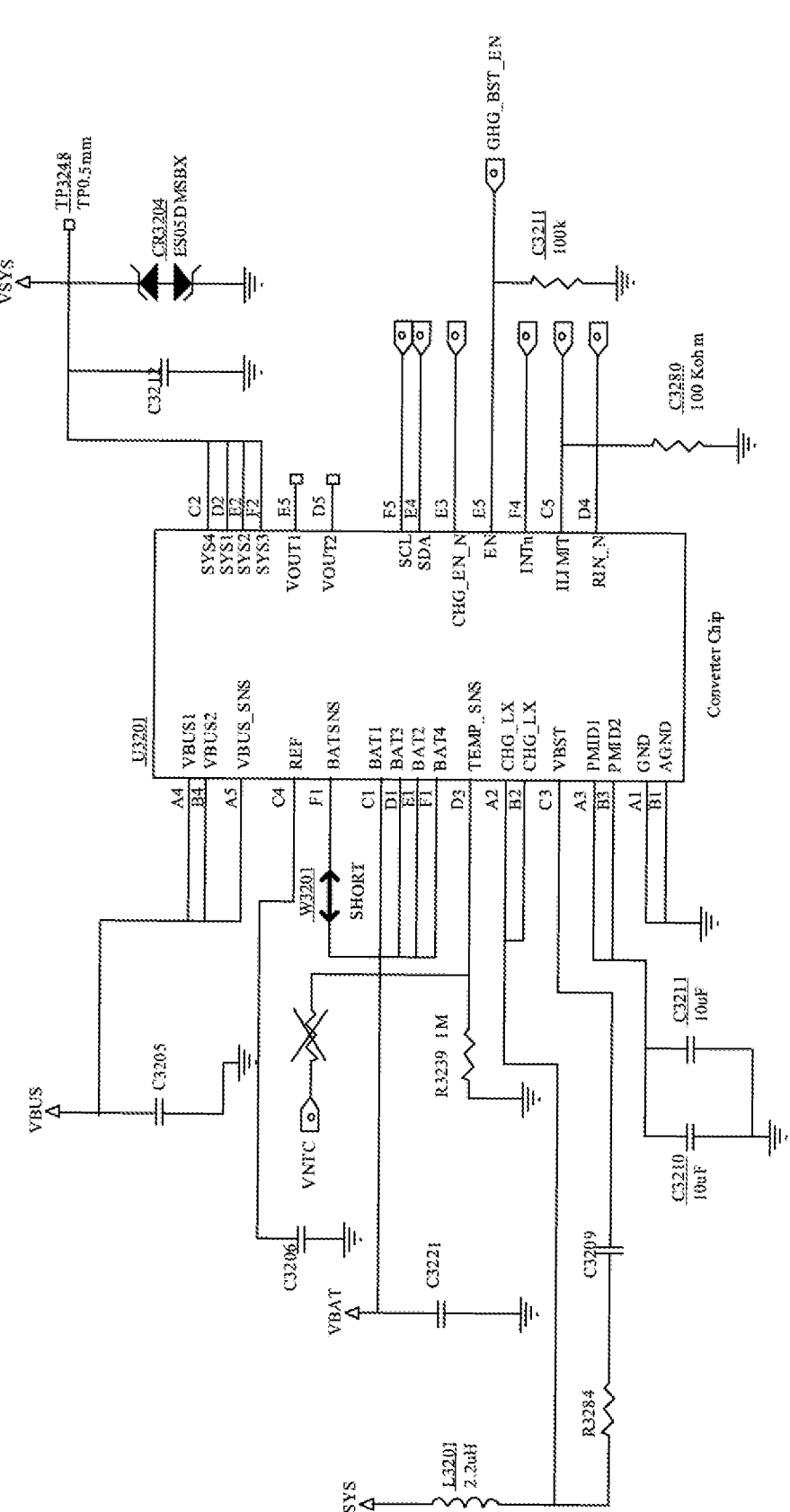
FIG. 5 is a schematic diagram illustrating a step-down converter circuit according to an embodiment of the disclosure.

In some embodiments, as illustrated in FIG. 5, the step-down converter circuit 13 may include:

a converter chip, including:

a voltage input pin VBUS1/VBUS2 connected to the voltage output end Vbus of the wireless receiver 10, configured to receive the output voltage from the voltage output end; and charging current output pins BAT1~BAT4 connected to a positive electrode of the battery, configured to charge the battery.

In an embodiment of the disclosure, the converter chip outputs a voltage at the charging current output pins after stepping down a voltage input into the voltage input pins, to charge the battery. The step-down converter circuit 13 generally operates in the constant voltage mode.

According to a second aspect of embodiments of the present disclosure, a method of charging a battery for a wearable device is provided. The method may include:

monitoring a voltage difference between an input voltage from a voltage output end of a wireless receiver and a charging voltage of a battery; and selecting one circuit between a charge pump circuit and a step-down converter circuit as a charging circuit to charge the battery based on the voltage difference between the input voltage from the voltage output end of the wireless receiver and the charging voltage of the battery.

The wireless receiver is configured to receive a charging power transmitted by a wireless transmitter through electromagnetic induction. The charge pump circuit connected to the voltage output end of the wireless receiver, is configured to boost the input voltage from the voltage output end. The step-down converter circuit connected to the voltage output end of the wireless receiver, is at least configured to perform step-down charging on the battery in a constant voltage mode.

In some embodiments, selecting one circuit between the charge pump circuit and the step-down converter circuit as the charging circuit to charge the battery based on the voltage difference between the input voltage from the voltage output end of the wireless receiver and the charging voltage of the battery may include:

selecting the charge pump circuit to charge the battery in response to monitoring that the input voltage from the voltage output end of the wireless receiver is N times of the charging voltage of the battery, N is greater than or equal to 2; and selecting the step-down converter circuit to charge the battery in response to monitoring that the input voltage from the voltage output end of the wireless receiver is less than twice the charging voltage of the battery.

In some embodiments, the charging current output pins BAT1~BAT4, include:

a first charging current output pin BAT1;

a second charging current output pin BAT2;

a third charging current output pin BAT3; and a fourth charging current output pin BAT4.

The first charging current output pin, the second charging current output pin, the third charging current output pin and the fourth charging current output pin connected in parallel are connected with the positive electrode of the battery.

In an embodiment of the disclosure, the converter chip may include four charging current output pins BAT; the four charging current output pins BAT connected in parallel are connected with the positive electrode of the battery, to charge the battery. As illustrated in FIG. 5, C3206~C3211 are capacitors, and R3239 is an inductor. REF, BATSNS, PMID1, PMID2 on a chip are various functional pins of the converter chip.

Figure 6:
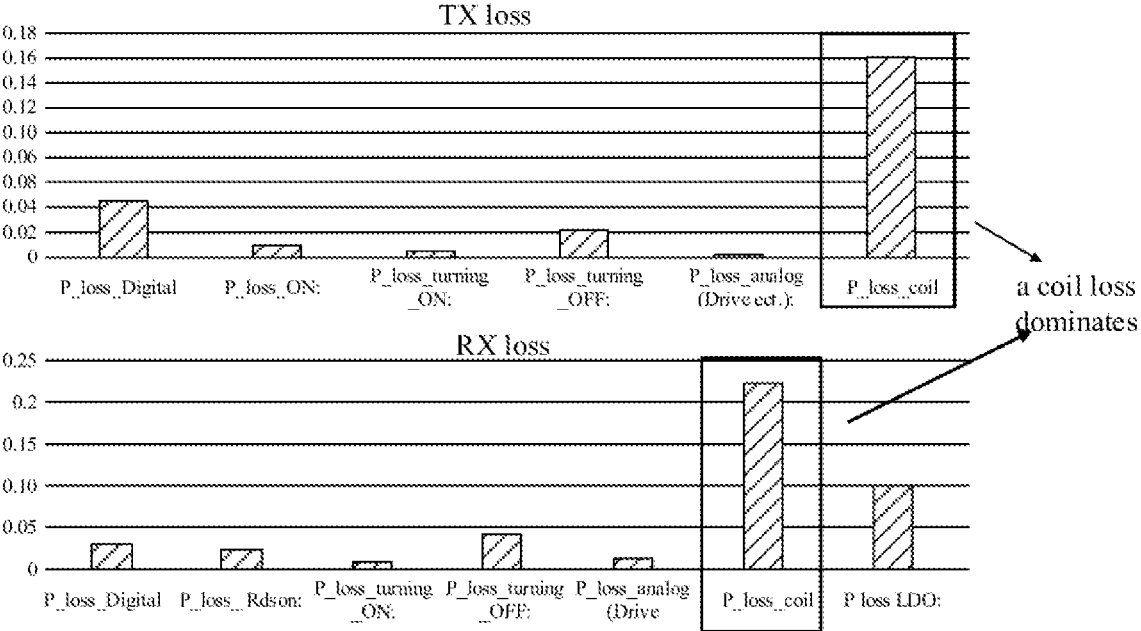
FIG. 6 is a schematic diagram illustrating a power distribution of a circuit of wireless charging according to an embodiment of the disclosure.

FIG. 6 is a schematic diagram illustrating a power distribution of a circuit of wireless charging according to an embodiment. As illustrated in FIG. 6, it may be determined that a coil loss dominates during wireless charging. In the disclosure, when charging with the same charging power, with boosting the input voltage from the voltage output end of the wireless receiver by boosting the coil voltage of the charging power of the wireless transmitter, a current under the same power is reduced since a voltage of the electromagnetic coil is boosted. A power loss of coils between the wireless transmitter and the wireless receiver may be effectively reduced based on a power loss $P=I^2R$. In addition, with regulating the voltage drop by the charge pump circuit, an electric energy loss during charging the battery may be reduced and a charging efficiency may be improved.

Figure 7:
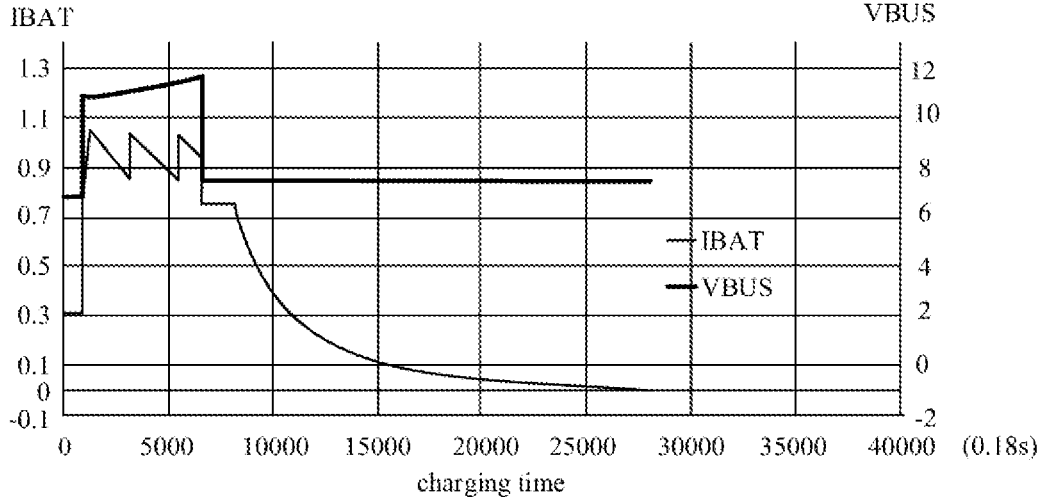
FIG. 7 is a schematic diagram illustrating current and voltage variation in a charging process of a circuit of wireless charging according to an embodiment of the disclosure.

FIG. 7 is a schematic diagram illustrating current and voltage change in a charging process of a circuit of wireless charging according to an embodiment of the disclosure. As illustrated in FIG. 7, IBAT represents a charging current, and VBUS represents an output voltage of the charging base (a wireless transmitter); a charging process may include at least three stages: an initial stage (0-500*0.18 s), a quick charge stage (500*0.18 s~6000*0.18 s), and a constant voltage stage (6000*0.18 s~30000*0.18 s). During the initial stage, the output voltage of the charging base (the wireless transmitter) is 7V, and the charging current is 0.3 A. During the quick charge stage, that is, during a stage of charging with the charge pump circuit, the output voltage oscillates between 11V and 12V, and the charging current is between 0.9 A and 1.0 A. During the constant voltage stage, that is, during a stage of charging with the step-down converter circuit, the output voltage is between 7V and 8V, and the charging current is continuously reduced from 0.8 A to 0 A until the charging is completed.

According to a second aspect of embodiments of the present disclosure, a method of charging a battery for a wearable device is provided. The method may include:

monitoring a voltage difference between an input voltage from a voltage output end of a wireless receiver and a charging voltage of a battery; and selecting one circuit between a charge pump circuit and a step-down converter circuit as a charging circuit to charge the battery based on the voltage difference between the input voltage from the voltage output end of the wireless receiver and the charging voltage of the battery.

The wireless receiver is configured to receive a charging power transmitted by a wireless transmitter through electromagnetic induction. The charge pump circuit connected to the voltage output end of the wireless receiver is configured to boost the input voltage from the voltage output end. The step-down converter circuit connected to the voltage output end of the wireless receiver is at least configured to perform step-down charging on the battery in a constant voltage mode.

In an embodiment of the disclosure, selecting one circuit between the charge pump circuit and the step-down converter circuit as the charging circuit to charge the battery based on the voltage difference between the input voltage from the voltage output end of the wireless receiver and the charging voltage of the battery may include:

selecting the charge pump circuit to charge the battery in response to monitoring that the input voltage from the voltage output end of the wireless receiver is N times of the charging voltage of the battery, N is greater than or equal to 2; and selecting the step-down converter circuit to charge the battery in response to monitoring that the input voltage from the voltage output end of the wireless receiver is less than twice the charging voltage of the battery.

In an embodiment of the present disclosure, the charge pump circuit may step down the input voltage from the voltage output end through energy storage of a capacitor to charge the battery, which may reduce a power loss and improve a charging efficiency compared with the converter. Voltage may be stepped down in an integer multiple. For example, when the charging voltage of the battery is 3V, the voltage of the voltage output end is 6V, 9V, etc. A charge pump circuit may step down the voltage 6V, 9V of the voltage output end to the charging voltage 3V of the battery, to charge the battery.

In an embodiment of the disclosure, a wireless charging circuit for a wireless charging apparatus may include a wireless transmitter and a control unit.

The wireless transmitter is configured to transmit a charging power with the wireless receiver through electromagnetic induction.

The control unit is electrically connected to the wireless transmitter, and is configured to adjust a coil voltage of the wireless transmitter based on the charging voltage of the battery.

In an embodiment of the disclosure, the wireless transmitter is in the wireless charging apparatus and coupled to an electromagnetic coil of the wireless receiver in the wearable device to transmit the charging power.

In an embodiment of the present disclosure, since the charge pump circuit may regulate a voltage drop, the control unit in the wireless charging apparatus may boost the coil voltage of a charging power transmitted by the wireless transmitter based on the monitored charging voltage of the battery, to boost the input voltage from the voltage output end of the wireless receiver. With boosting the input voltage from the voltage output end of the wireless receiver by boosting the coil voltage of the charging power of the wireless transmitter, a power loss of coils between the wireless transmitter and the wireless receiver may be effectively reduced. In addition, with regulating the voltage drop by the charge pump circuit, an electric energy loss during charging the battery may be reduced and a charging efficiency may be improved.

In an embodiment of the present disclosure, the controller is in a wearable device, and connected with the wireless receiver, the charge pump circuit and the step-down converter circuit through an $I^2C$ bus. The controller may read the input voltage from the wireless receiver by the $I^2C$ bus, and select one circuit between the charge pump circuit and the step-down converter circuit as the charging circuit to charge the battery based on the voltage difference between the input voltage from the voltage output end of the wireless receiver and the charging voltage of the battery. For example, when the voltage difference between the input voltage from the voltage output end of the wireless receiver and the charging voltage of the battery is an integer multiple greater than or equal to 2 of the charging voltage of the battery, the charge pump circuit is selected as the charging circuit to charge the battery. When the voltage difference between the input voltage from the voltage output end of the wireless receiver and the charging voltage of the battery is less than the charging voltage of the battery, the step-down converter circuit is selected as the charging circuit to charge the battery. For example, when the charging voltage of the battery is 3V, the voltage of the voltage output end is 6V, or 9V, etc. Selecting the charge pump circuit as the charging circuit may cause the voltage 6V or 9V of the voltage output end to be stepped down to the charging voltage 3V of the battery, to charge the battery.

The circuit of wireless charging for the wearable device in an embodiment of the disclosure includes the wireless receiver configured to receive the charging power transmitted by the wireless transmitter through electromagnetic induction; the charge pump circuit connected to the voltage output end of the wireless receiver, configured to step down the output voltage of the charge pump circuit through energy storage of the internal capacitor, to perform step-down charging on the battery; the step-down converter circuit connected to the voltage output end of the wireless receiver, at least configured to perform the step-down charging on the battery in the constant voltage mode; and the controller electrically connected to the wireless receiver, the charge pump circuit and the step-down converter circuit, configured to select one circuit between the charge pump circuit and the step-down converter circuit as the charging circuit to charge the battery based on the voltage difference between the input voltage from the voltage output end of the wireless receiver and a charging voltage of the battery. In the present disclosure, the charge pump circuit is provided in the charging circuit, and the output voltage is stepped down based on the energy storage of the capacitor to charge the battery, which is beneficial to reducing a power loss and improving a charging efficiency.

A wearable device is provided in an embodiment of the present disclosure. The wearable device may include:

a battery; and a circuit of wireless charging as described in the above embodiments connected to a positive electrode of the battery, configured to charge the battery.

A system of charging management is provided in an embodiment of the present disclosure.

The system may include: a processor and a memory configured to store a computer program executable on the processor. The processor is configured to perform the blocks of the method as described in the above embodiments when running the computer program.

In an embodiment of the present disclosure, the wearable device may include a watch, a bracelet, etc.

According to an embodiment of the present disclosure, a computer readable storage medium storing a computer program is provided. The computer program is configured to implement the blocks of the method as described in the above embodiments when executed by a processor.

Figure 8:
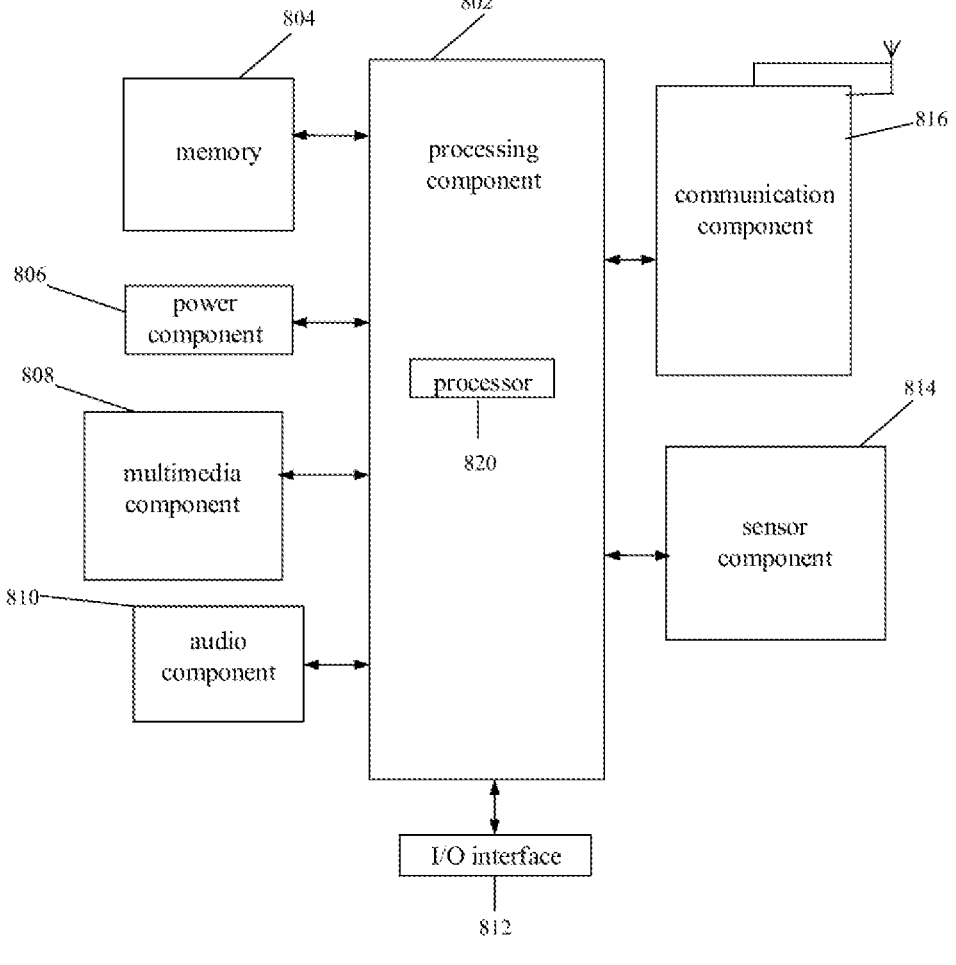
FIG. 8 is a block diagram illustrating an electronic device according to an embodiment of the disclosure.

FIG. 8 is a block diagram illustrating an electronic device according to an example embodiment. For example, the electronic device may be a mobile phone, a computer, a digital broadcasting electronic device, a messaging device, a game console, a tablet device, a medical equipment, a fitness equipment, a personal digital assistant, etc.

Referring to FIG. 8, the electronic device may include one or more components: a processing component 802, a memory 804, a power supply component 806, a multimedia component 808, an audio component 810, an input/output (I/O) of interface 812, a sensor component 814, and a communication component 816.

The processing component 802 generally controls the whole operation of the electronic device, such as the operations related to touch, phone call, data communication, camera operation and recording operation. The processing component 802 may include one or more processors 820 to perform instructions, to complete all or part of blocks of the above method. In addition, the processing component 802 may include one or more modules for the convenience of interaction between the processing component 802 and other components. For example, the processing component 802 may include a multimedia module for the convenience of interaction between the multimedia component 808 and the processing component 802.

The memory 804 is configured to store all types of data to support the operation of the electronic device. Examples of the data include the instructions of any applications or methods operated on the electronic device, contact data, phone book data, messages, pictures, videos, etc. The memory 804 may be implemented by any type of volatile or non-volatile storage devices or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power supply component 806 may provide power for all components of the electronic device. The power supply component 806 may include a power supply management system, one or more power supplies, and other units related to generating, managing and distributing power for the electronic device.

The multimedia component 808 includes an output interface screen provided between the electronic device and the user. In some embodiments, a screen may include a liquid crystal display (LCD) and a touch panel (TP). When the screen includes a touch panel, the screen may be implemented as a touch screen to receive input signals from the user. The touch panel includes one or more touch sensors to sense touching, sliding and gestures on the touch panel. The touch sensor may not only sense the boundary of touch or slide action, but also detect the duration and pressure related to the touching or sliding operation. In some embodiments, the multimedia component 808 includes a front camera and/or a rear camera. When the electronic device is in operation mode, such as shooting mode or video mode, the front camera or the rear camera may receive the external multimedia data. Each front camera and rear camera may be a fixed optical lens system or an optical lens system with focal length and optical zoom capacity.

The audio component 810 is configured as an output and/or input signal. For example, the audio component 810 includes a microphone (MIC). When the electronic device is in operation mode, such as call mode, record mode, and speech recognition mode, the microphone is configured to receive the external audio signals. The audio signals received may be further stored in the memory 804 or sent via the communication component 816. In some embodiments, the audio component 810 further includes a speaker configured to output an audio signal.

The I/O interface 812 provides an interface for the processing component 802 and the peripheral interface module, and the peripheral interface module may be a keyboard, a click wheel, a button, etc. The buttons may include but not limited to a home button, a volume button, a start button and a lock button.

The sensor component 814 includes one or more sensors, configured to provide various aspects of status assessment for the electronic device. For example, the sensor component 814 may detect the on/off state of the electronic device and the relative positioning of the component. For example, the component is a display and a keypad of the electronic device. The sensor component 814 may further detect the location change of the electronic device or one component of the electronic device, the presence or absence of contact between the user and the device, the orientation or acceleration/deceleration of the device, and the temperature change of the device. The sensor component 814 may include a proximity sensor, which is configured to detect the existence of the objects nearby without any physical contact. The sensor component 814 may further include a light sensor such as CMOS or CCD image sensor, which is configured to use in imaging applications. In some embodiments, the sensor component 814 may further include an acceleration transducer, a gyroscope sensor, a magnetic sensor, a pressure sensor or a temperature sensor.

The communication component 816 is configured for the convenience of wire or wireless communication between the electronic device and other devices. The electronic device may access wireless networks based on a communication standard, such as Wi-Fi, 4G or 5G, or their combination. In an exemplary embodiment, the communication component 816 receives broadcast signals or broadcast-related information from an external broadcast management system via a broadcast channel. In an exemplary embodiment, the communication component 816 includes a near field communication (NFC) module to facilitate short-range communication. For example, an NFC module may be implemented based on radio frequency identification (RFID) technology, infrared data association (IRDA) technology, ultra-wideband (UWB) technology, bluetooth (BT) technology and other technologies.

In an example embodiment, the electronic device may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronics components, which is configured to perform the above method.

After considering the specification and practicing the disclosure herein, those skilled in the art will easily think of other implementations. The present application is intended to cover any variations, usages, or adaptive changes of the present disclosure. These variations, usages, or adaptive changes follow the general principles of the present disclosure and include common knowledge or conventional technical means in the technical field not disclosed by the present disclosure. The description and the embodiments are to be regarded as exemplary only, and the true scope and spirit of the present disclosure are given by the appended claims.

It should be understood that the present disclosure is not limited to the precise structure described above and shown in the drawings, and various modifications and changes may be made without departing from its scope. The scope of the present application is only limited by the appended claims. The scope of the present application is only limited by the appended claims.

What is claimed is:

1. A circuit of wireless charging for a wearable device, comprising:

a wireless receiver, configured to receive a charging power transmitted by a wireless transmitter of a wireless charging apparatus through electromagnetic induction;

a charge pump circuit connected to a voltage output end of the wireless receiver, configured to receive an input voltage boosted from the voltage output end, and step down the input voltage to an output voltage of the charge pump circuit, to charge a battery in the wearable device based on the input voltage that is stepped down;

a step-down converter circuit connected to the voltage output end of the wireless receiver, configured to perform step-down charging on the battery at least in response to determining that a charging mode is in a constant voltage mode; and a controller electrically connected to the wireless receiver, the charge pump circuit and the step-down converter circuit, configured to select one between the charge pump circuit and the step-down converter circuit as a charging path to charge the battery based on a voltage difference between the input voltage from the voltage output end of the wireless receiver and a charging voltage of the battery;

wherein the controller is configured to:

select the charge pump circuit to charge the battery in response to monitoring that the input voltage from the voltage output end of the wireless receiver is two or more times of the charging voltage of the battery; and select the step-down converter circuit to charge the battery in response to monitoring that the input voltage from the voltage output end of the wireless receiver is less than twice the charging voltage of the battery.

2. The circuit of claim 1, wherein the controller is configured to:

determine a remaining power of the battery; and determine a charging mode of the wireless charging circuit for the wearable device based on the remaining power of the battery.

3. The circuit of claim 2, wherein different charging modes correspond to different charging voltages of the wireless charging circuit for the wearable device.

4. The circuit of claim 2, wherein the controller is configured to:

charge the battery in a first charging mode through the step-down converter circuit in response to determining that the remaining power of the battery is greater than a first threshold; and charge the battery in a second charging mode through the charge pump circuit in response to determining that the remaining power of the battery is less than the first threshold.

5. The circuit of claim 4, wherein the first charging mode is different from the second charging mode, and the charging voltage of the battery under the first charging mode is less than the charging voltage of the battery under the second charging mode.

6. The circuit of claim 1, wherein the controller is configured to:

acquire a physical sign state of a human body;

charge the battery in a first charging mode by the step-down converter circuit in response to determining that the physical sign state is a sleep state; and charge the battery in a second charging mode by the charge pump circuit in response to determining that the physical sign state is an active state.

7. The circuit of claim 6, wherein the first charging mode is different from the second charging mode, and the charging voltage of the battery under the first charging mode is less than the charging voltage of the battery under the second charging mode.

8. The circuit of claim 1, wherein the charge pump circuit at least comprises:

a charge pump chip, at least comprising:

a voltage input pin; and an overvoltage protection pin;

a triode, at least comprising:

a drain connected to the voltage output end of the wireless receiver, configured to receive the input voltage from the voltage output end;

a source connected to the voltage input pin of the charge pump chip, configured to transmit the input voltage to the charge pump chip; and a gate connected to the overvoltage protection pin of the charge pump chip, configured to provide overvoltage protection for the charge pump chip.

9. The circuit of claim 8, wherein the charge pump chip comprises:

a voltage output pin;

wherein the voltage output pin is connected to a capacitor for energy storage; and a first terminal of the capacitor is grounded, and a second terminal of the capacitor is configured to connect a positive electrode of the battery.

10. The circuit of claim 1, wherein the step-down converter circuit comprises:

a converter chip, comprising:

a voltage input pin connected to the voltage output end of the wireless receiver, configured to receive the input voltage from the voltage output end; and a charging current output pin connected to a positive electrode of the battery, configured to charge the battery.

11. A circuit of wireless charging for a wireless charging apparatus, comprising:

a wireless transmitter, configured to transmit a charging power with a wireless receiver of a wearable device through electromagnetic induction, wherein a voltage output end of the wireless receiver is configured to be connected to a charge pump circuit and step-down converter circuit of the wearable device; and a controller electrically connected to the wireless transmitter, configured to adjust a coil voltage of the wireless transmitter based on a charging voltage of a battery of the wearable device, wherein adjusting the coil voltage of the wireless transmitter comprises boosting the coil voltage of the wireless transmitter;

wherein one between the charge pump circuit and the step-down converter circuit is selected to be as a charging path to charge the battery based on a voltage difference between an input voltage from the voltage output end of the wireless receiver and a charging voltage of a battery of the wearable device, wherein the charge pump circuit is selected to charge the battery in response to monitoring that the input voltage from the voltage output end of the wireless receiver is two or more times of the charging voltage of the battery, and the step-down converter circuit is selected to charge the battery in response to monitoring that the input voltage from the voltage output end of the wireless receiver is less than twice the charging voltage of the battery.

12. The circuit of claim 11, wherein a wireless communication between the wireless transmitter and the wireless receiver is established; and the controller is configured to acquire the charging voltage of the battery through the wireless communication, and adjust the coil voltage of the wireless transmitter based on a boost requirement of a charge pump circuit of the wearable device.

13. The circuit of claim 12, wherein the controller is configured to, acquire a communication mark used in response to determining the wireless communication between the wearable device and a wireless charging apparatus is established, wherein the communication mark is at least configured to identify whether the wearable device is an authorizable charging terminal of the wireless charging apparatus, and the wireless charging apparatus at least comprises the wireless charging circuit; and wirelessly charge the wearable device through the wireless charging circuit based on the wireless communication established in response to determining that the communication mark identifies that the wearable device is the authorizable charging terminal of the wireless charging apparatus.

14. A method of charging a battery for a wearable device, comprising:

monitoring a voltage difference between an input voltage from a voltage output end of a wireless receiver and a charging voltage of a battery of a wearable device; and selecting one circuit between a charge pump circuit and a step-down converter circuit as a charging path to charge the battery based on the voltage difference between the input voltage from the voltage output end of the wireless receiver and the charging voltage of the battery;

wherein, the wireless receiver is configured to receive a charging power transmitted by a wireless transmitter through electromagnetic induction; the charge pump circuit is configured to receive an input voltage boosted from the voltage output end, and step down the input voltage to an output voltage of the charge pump circuit, to charge the battery based on the input voltage that is stepped down; and the step-down converter circuit is configured to perform step-down charging on the battery at least in response to determining that a charging mode is in in a constant voltage mode;

wherein selecting one circuit between the charge pump circuit and the step-down converter circuit as the charging path to charge the battery based on the voltage difference between the input voltage from the voltage output end of the wireless receiver and the charging voltage of the battery comprises:

selecting the charge pump circuit to charge the battery in response to monitoring that the input voltage from the voltage output end of the wireless receiver is two or more times of the charging voltage of the battery; and selecting the step-down converter circuit to charge the battery in response to monitoring that the input voltage from the voltage output end of the wireless receiver is less than twice the charging voltage of the battery.

15. The method of claim 14, further comprising:

determining a remaining power of the battery; and determining a charging mode for the wearable device based on the remaining power of the battery.

16. The method of claim 15, wherein determining the charging mode for the wearable device based on the remaining power of the battery comprises:

charging the battery in a first charging mode through the step-down converter circuit in response to determining that the remaining power of the battery is greater than a first threshold; and charging the battery in a second charging mode through the charge pump circuit in response to determining that the remaining power of the battery is less than the first threshold.

17. The method of claim 16, wherein the first charging mode is different from the second charging mode, and the charging voltage of the battery under the first charging mode is less than the charging voltage of the battery under the second charging mode.

18. The method of claim 14, further comprising:
acquiring a physical sign state of a human body;
charging the battery in a first charging mode by the step-down converter circuit in response to determining that the physical sign state is a sleep state; and
charging the battery in a second charging mode by the charge pump circuit in response to determining that the physical sign state is an active state.

* * * * *